United States Patent Office 3,721,686
Patented Mar. 20, 1973

3,721,686
NOVEL 6α-FLUORO-11β-HYDROXY-16α-METHYL-
21-HALO-PROGESTERONES
Henry Laurent, Karl Heinz Kolb, and Rudolf Wiechert, Berlin, Germany, assignors to Schering Aktiengesellschaft, Berlin, Germany
No Drawing. Filed Feb. 22, 1971, Ser. No. 117,756
Claims priority, application Germany, Feb. 28, 1970,
P 20 10 458.9
Int. Cl. C07c 169/34
U.S. Cl. 260—397.45                 10 Claims

ABSTRACT OF THE DISCLOSURE 21-halo-steroids of the formula

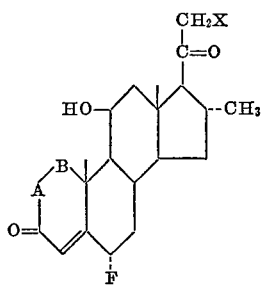

wherein —A—B— is one of the groups —CH$_2$—CH$_2$—, —CH=CH—, or —CCl=CH—, and X is a halogen atom, have excellent anti-inflammatory activity, especially topical anti-inflammatory activity, with a low incidence of side effects, e.g., sodium retention and potassium excretion.

BACKGROUND OF THE INVENTION

This invention relates to novel halo-steroids, to their production and to their use as anti-inflammatory agents.

SUMMARY OF THE INVENTION

The compounds of this invention are 21-halo-steroids of the formula

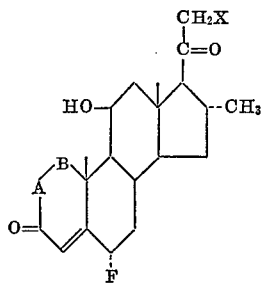

wherein —A—B— is one of the groups —CH$_2$—CH$_2$—, —CH=CH—, or —CCl=CH—, and X is a halogen atom; to pharmaceutically acceptable compositions comprising them and to their use as topical anti-inflammatory agents.

DETAILED DISCUSSION

Of the compounds of this invention, especially preferred are the following classes:
(1) Compounds of Formula I wherein X is Cl.
(2) Compounds of Formula I wherein X is F.
(3) Compounds of Formula I wherein —A—B— is —CH=CH—.

The compounds of this invention are prepared by the exchange of the 21-hydroxy group by halogen of the 21-hydroxy steroid of the formula

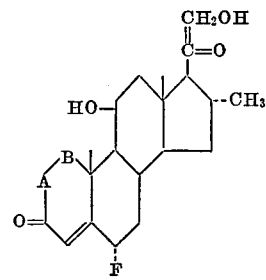

wherein the group —A—B— has the meaning given in Formula I.

A preferred method for exchanging the 21-hydroxy group with halogen resides in esterifying the 21-hydroxy group with a sulfonic acid, preferably methanesulfonic acid or p-toluenesulfonic acid, and thereafter replacing the sulfonic acid group with halogen. The esterification of the 21-hydroxy group is conducted, for example, by treating a compound of Formula II with a sulfonic acid chloride in the presence of an organic base, e.g., pyridine, or in the presence of aqueous alkali. The exchange of the sulfonic acid group with a halogen atom is preferably effected by reacting the 21-sulfonic acid esters in a polar solvent with an alkali halide, e.g., potassium hydrogen fluoride or lithium chloride, at about 50–180° C. Especially suitable as polar solvents are dipolar aprotic solvents, e.g., dimethylformamide, dimethyl acetamide, hexamethylphosphoric triamide, or N-methylpyrrolidone, to which are optionally added minor amounts of protonic solvents, e.g., methanol, ethanol, or water.

Another method for exchanging the 21-hydroxy group with a halogen atom resides in reacting a compound of Formula II with a conventional halogenating agent, e.g., methanesulfonic acid chloride. This reaction is preferably conducted with an excess of halogenating agent in the presence of an organic base, e.g., pyridine, at a reaction temperature of below 80° C.

The 21-fluoro-compounds can be prepared from the corresponding 21-bromo- or 21-iodo-compounds by reaction with silver fluoride.

The novel compounds have excellent topical anti-inflammatory activity, as evidenced by the vasoconstriction test on experimentally hyperemized human skin after local application. The vasoconstriction test was conducted as follows: The stratum corneum on the backs of volunteers for the experiment was divided by applying a transparent adhesive strip of a 2 cm. width 20 times successively on the same spot and tearing it off again, which produced a pronounced hyperemia. Then, within the stripped area, with the application of the same pressure, in each instance, approximately 50 mg. of a water/oil salve base containing respectively 0.01% of the anti-inflammatory compound being tested, were applied to marked areas of 4 cm.² each. The backs of the persons submitting to the experiment were thereafter photographed at specific intervals with a Kodak color film. In order to evaluate hyperemia and vasoconstriction, the color of the individual skin zones on the Kodak color film was translated into brightness (light intensity) values. The sections projected by the color film through a diaphram on an interference filter differ from one another in brightness. As the brightness indicator, a secondary electron multiplier was employed, and the anode current was measured to determine the cromaticity set forth in the table below. In order to determine the vasoconstriction, the chromaticity value of the untreated stripped skin and of the treated stripped skin was determined and compared with the chromaticity value of the normal skin, with the chromaticity value of the normal skin being assigned the value 100 and the chromaticity value of the untreated stripped skin being assigned 0. Skin areas to which an anti-inflammatory compound was applied have values ranging from 0 to 100, depending on the time of observation and the activity of the compound.

TABLE 1

Vasoconstriction on experimentally hyperemized skin after treatment with 0.01% test substance (chromaticity value of normal skin=100, chromaticity value of hyperemized skin=0)

| Compound | Observation time in hours | | | | | | |
|---|---|---|---|---|---|---|---|
| | 1 | 2 | 3 | 4 | 5 | 6 | 7 |
| I. 6α-fluoro-11β,21-dihydroxy-16α-methyl-1,4-pregnadiene-3,20-dione (Standard). | 0 | 20 | 40 | 50 | 80 | 100 | |
| II. 6α,21-difluoro-11β-hydroxy-16α-methyl-1,4-pregnadiene-3,20-dione. | 0 | 20 | 40 | 75 | 100 | | |
| III. 6α-fluoro-21-chloro-11β-hydroxy-16α-methyl-1,4-pregnadiene-3,20-dione. | 10 | 30 | 45 | 60 | 90 | 100 | |
| IV. 6α,21-difluoro-2-chloro-11β-hydroxy-16α-methyl-1,4-pregnadiene-3,20-dione. | 0 | 20 | 40 | 50 | | 100 | |
| V. 6α-fluoro-2,21-dichloro-11β-hydroxy-16α-methyl-1,4-pregnadiene-3,20-dione. | 0 | 20 | 40 | 50 | | 100 | |

The experimental results set forth in Table 1 demonstrate that the compounds II to V possess as high topical anti-inflammatory activity in this test as the structurally analogous 6α - fluoro-11β,21-dihydroxy-16α-methyl -1,4-pregnadiene-3,20-dione (Compound I) which, as is known, is one of the most effective commercially available antiphlogistics.

Compared to 6α-fluoro - 11β,21 - dihydroxy-16α-methyl-1,4-pregnadiene-3,20-dione, however, the compounds of this invention are surprisingly distinguished in that the side effects caused thereby, e.g., the effect on the hydrocarbon metabolism and sodium and potassium excretion, are very minor.

The glucogenic effect of the compounds of this invention was determined in the conventional hepatic glycogen test according to Balzer and Palm (Naunyn-Schmiedebergs Arch. exp. u. Pharmak. 243, 1962, 65–84). The dosage was determined at which, after subcutaneous administration of the test compounds, an increase of hepatic glycogen was observed in the test rats which was identitcal to that caused by the subcutaneous administration of 20 μg. of 6α-fluoro-11β,21-dihydroxy-16α-methyl-1,4-pregnadiene-3,20-dione.

TABLE 2

Dosage which causes identical increases in hepatic glycogen

| Compound | Dosage, μg. |
|---|---|
| I. 6α-fluoro-11β,21-dihydroxy-16α-methyl-1,4-pregnadiene-3,20-dione (Standard). | 20 |
| II. 6α,21-difluoro-11β-hydroxy-16α-methyl-1,4-pregnadiene-3,20-dione. | 100 |
| III. 6α,fluoro-21-chloro-11β-hydroxy-16α-methyl-1,4-pregnadiene-3,20-dione. | >200 |
| IV. 6α,21-difluoro-2-chloro-11β-hydroxy-16α-methyl-1,4-pregnadiene-3,20-dione. | 250 |
| V. 6α-fluoro-2,21-dichloro-11β-hydroxy-16α-methyl-1,4-pregnadiene-3,20-dione. | >500 |

It can be seen from Tables 1 and 2 that in the compounds of this invention there is a dissociation between desired anti-inflammatory effect and undesired glycogenic side-effect which is about five to twenty-five times more favorable than in case of 6α-fluoro-11β,21-dihydroxy-16α-methyl-1,4-pregnadiene-3,20-dione.

The novel compounds are therefore highly suitable, due to their excellent anti-inflammatory effectiveness and their minor side-effects, in combination with the vehicles customary in galenic pharmacy, for the treatment of, for example:

(a) Locally: Contact dermatitis, erythrodermia, first-degree burns, pruitus vulvae et ani, rosacea, erythematodes cutaneus, psoriasis, lichen ruber planus et verrucosus.

(b) Orally: Acute and chronic polyarthritis, neurodermitis, bronchial asthma, hay fever, and others.

The compounds can be employed in the treatment of inflammatory conditions formulated in conventional pharmaceutically acceptable carriers in the forms customarily employed in pharmaceuticals. For oral administration, especially suitable are tablets, dragees, capsules, pills, suspensions and solutions. Suitable excipients for tablets are, for example, lactose, amylose, talc, gelatin, magnesium stearate, and the like.

For topical administration, suitable are powders, solutions, suspensions, aerosols, and vaginal suppositories. For parenteral application, aqueous and oily solutions or suspensions can be employed.

The compounds of this invention are formulated so as to provide, for example, 1–150 mg. of the effective agent in admixture with 20 mg. to 5 g. of a pharmacologically indifferent excipient, i.e., a pharmaceutically acceptable carrier, per unit dosage, e.g., per tablet.

The novel effective agents are usually administered topically at concentrations in the pharmaceutical carrier of between 0.02 and 0.5%, preferably 0.05 to 0.2%.

The novel 21-halo-steroids are also valuable intermediates for the production of highly effective polyhalo anti-inflammatory derivatives of 1,4-pregnadiene-3,20-dione.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

PREPARATION 1

A solution of 25.0 g. of 6α-fluoro-11β-hydroxy-21-acetoxy-16α-methyl-1,4-pregnadiene-3,20-dione in 125 ml. of tetrahydrofuran and 250 ml. of methylene chloride is mixed, at −10° C., with 50 g. of N-chlorosuccinimide and 62.5 ml. of HCl-saturated dioxane. After 10 minutes, the reaction mixture is poured into water and extracted with methylene chloride, the extract is washed with sodium sulfite solution, sodium bicarbonate solution, and water, the product is dried over sodium sulfate, and the solvent is evaporated. The crude product is chromatographed on silica gel. With 1.9–2.8% acetone-methylene chloride, 9.4 g. of 6α-fluoro-2-chloro-11β-hydroxy-21-acetoxy-16α-methyl-1,4-pregnadiene - 3,20 - dione is eluted, M.P. 207–209° C. $[\alpha]_D^{25} = +86°$ (chloroform); UV: $\epsilon_{249} = 14,800$ (methanol).

Two grams of 6α-fluoro-2-chloro-11β-hydroxy-21-acetoxy-16α-methyl-4-pregnene-3,20-dione is dissolved in 11 ml. of methylene chloride and 30 ml. methanolic 0.2 N KOH solution is added thereto. After 20 minutes, the reaction solution is diluted with methylene chloride and washed neutral with water. The organic phase is dried and concentrated and the residue is chromatographed on silica gel. With 8–13% acetone-methylene chloride, 1.22 g. of 6α - fluoro-2-chloro-11β,21-dihydroxy-16α-methyl-1,4-pregnadiene-3,20-dione is obtained by elution; M.P. 211–215° C. (from methylene chloride-hexane); $[\alpha]_D^{25} = +66°$ (chloroform); UV: $\epsilon_{250} = 14,800$ (methanol).

PREPARATION 2

10.0 g. 6α - fluoro-11β,21-dihydroxy-16α-methyl-1,4-pregnadiene-3,20-dione in 200 ml. pyridine were reacted with a solution of 8 ml. methanesulfochloride in 20 ml. chloroform, and the reaction mixture stirred for 3 hours at 0° C. Then the reaction mixture was poured into water and extracted with methylene chloride. The extract was washed with water and after drying over sodium sulfate, evaporated. The residue was chromatographed on silica gel. 8–10% acetone-hexane eluated 3.36 g. 6α - fluoro-11β-hydroxy-21-mesyloxy-16α-methyl-1,4-pregnadiene-3,20-dione having a melting point of 142–144° C. (out of aqueous acetone).

In the same manner 6α-fluoro-11β,21-dihydroxy-16α-methyl-4-pregnene-3,20-dione was converted to 6α-fluoro-11β-hydroxy - 21 - mesyloxy-16α-methyl-4-pregnene-3,20- dione having a melting point of 176–179° C. (out of acetone-hexane) and 6α - fluoro - 2 - chloro-11β,21-dihydroxy-16α-methyl-1,4-pregnadiene - 3,20 - dione was converted to 6α - fluoro-2-chloro-11β-hydroxy-21-mesyloxy-16α-methyl-1,4-pregnadiene-3,20-dione having a melting point of 133–135° C. (out of acetone-hexane).

EXAMPLE 1

A solution of 3.0 g. of 6α-fluoro-11β-hydroxy-21-mesyloxy-16α-methyl-1,4-pregnadiene-3,20-dione in 100 ml. of dimethylformamide is heated, after the addition of 6 g. of potassium hydrogen fluoride, for 15 hours under nitrogen to 110° C. The reaction product is precipitated with water, vacuum-filtered, washed, dried, and chromatographed on silica gel. With 6–9% acetone-methylene chloride, 612 mg. of 6α-21-difluoro-11β-hydroxy-16α-methyl-1,4-pregnadiene-3,20-dione is obtained by elution, M.P. (recrystallized from acetone-hexane) 234–236° C. $[\alpha]_D^{25} = +124°$ (chloroform); UV: $\epsilon_{242} = 15,900$ (methanol).

EXAMPLE 2

A solution of 5.0 g. of 6α-fluoro-11β-hydroxy-21-mesyloxy-16α-methyl-1,4-pregnadiene-3,20-dione in 100 ml. of dimethylformamide is mixed with 10 g. of lithium chloride and heated for two hours to 100° C. The reaction mixture is poured into water, the thus-precipitated product is vacuum-filtered, taken up in methylene chloride, dried with sodium sulfate, and concentrated under vacuum. After recrystallization from acetone-methylene chloride, 3.29 g. of 6α-fluoro-21-chloro-11β-hydroxy-16α-methyl-1,4-pregnadiene-3,20-dione is obtained, M.P. 253–254° C. $[\alpha]_D^{25} = +141°$ (chloroform); UV: $\epsilon_{242} = 16,300$ (methanol).

EXAMPLE 3

A solution of 13.5 g. of 6α-fluoro-11β-hydroxy-21-mesyloxy-16α - methyl - 4 - pregnene - 3,20 - dione and 27 g. of potassium hydrogen fluoride in a mixture of 108 ml. of dimethyl sulfoxide and 27 ml. of methanol is heated for one hour to 150° C. The crude product is precipitated with water, vacuum-filtered, washed, dried, and chromatographed on silica gel. With 5–8% acetone-methylene chloride, 1.68 g. of 6α,21-difluoro - 11β - hydroxy-16α-methyl-4-pregnene-3,20-dione is obtained, M.P. (after recrystallization from acetone-hexane) 210–213° C.

$[\alpha]_D^{25} = +177°$ (chloroform)

UV: $\epsilon_{237} = 14,800$ (methanol).

EXAMPLE 4

4.5 g. of 6α-fluoro-11β-hydroxy-21-mesyloxy-16α-methyl-4-pregnene-3,20-dione and 9 g. of lithium chloride in 45 ml. of dimethylformamide and 5 ml. of water are heated for one hour to 100° C. The crude product is chromatographed on silica gel. With 18–30% acetone-pentane, 2.19 g. of 6α-fluoro-21-chloro-11β-hydroxy-16α-methyl-4-pregnene-3,20-dione is obtained, M.P. (after recrystallization from acetone-hexane) 214–215° C.

$[\alpha]_D^{25} = +187°$ (chloroform)

UV: $\epsilon_{237} = 14,400$ (methanol).

EXAMPLE 5

1.4 g. of 6α-fluoro-2-chloro-11β-hydroxy-21-mesyloxy-16α-methyl-1,4-pregnadiene-3,20-dione is reacted, as described in Example 3, with potassium hydrogen fluoride. The crude product is chromatographed on silica gel. With 13–15% acetone-pentane, 203 mg. of 6α,21-difluoro-2-chloro-11β-hydroxy-16α-methyl - 1,4 - pregnadiene-3,20-dione is obtained, M.P. (after recrystallization from acetone-hexane) 217–219° C. $[\alpha_5_D^{25} = 85°$ (chloroform); UV: $\epsilon_{250} = 15,300$ (methanol).

EXAMPLE 6

2.0 g. of 6α-fluoro-2-chloro - 11β,21 - dihydroxy - 16α-methyl-1,4-pregnadiene-3,20-dione is dissolved in 40 ml. of pyridine. The solution is mixed with 1.8 ml. of methanesulfonic acid chloride, and the reaction mixture is agitated at 25° C. for 24 hours. Thereafter, the reaction mixture is poured into ice water, the thus-precipitated substance is isolated, and chromatographed on silica gel with acetone-hexane, thus obtaining 437 mg. of 6α-fluoro-2,21-dichloro-11β-hydroxy-16α-methyl - 1,4 - pregnadiene-3,20-dione, M.P. 110–118° C. $[\alpha]_D^{25} = +100°$ (chloroform); UV: $\epsilon_{249} = 14,400$ (methanol).

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A 21-halo-steroid of the formula

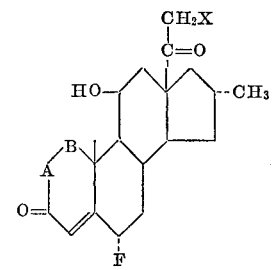

wherein —A—B— is —CH$_2$—CH$_2$—, —CH=CH—, or —CCl=CH— and X is Cl or F.

2. A compound of claim 1 wherein X is Cl.
3. A compound of claim 1 wherein X is F.
4. A compound of claim 1 wherein —A—B— is —CH=CH—.
5. A compound of claim 1, 6α,21-difluoro-11β-hydroxy-16α-methyl-1,4-pregnadiene-3,20-dione.
6. A compound of claim 1, 6α-fluoro-21-chloro-11β-hydroxy-16α-methyl-1,4-pregnadiene-3,20-dione.
7. A compound of claim 1, 6α,21-difluoro-11β-hydroxy-16α-methyl-4-pregnene-3,20-dione.
8. A compound of claim 1, 6α-fluoro-21-chloro-11β-hydroxy-16α-methyl-4-pregnene-3,20-dione.
9. A compound of claim 1, 6α,21-difluoro-2-chloro-11β-hydroxy-16α-methyl-1,4-pregnadiene-3,20-dione.
10. A compound of claim 1, 6α-fluoro-2,21-dichloro-11β-hydroxy-16α-methyl-1,4-pregnadiene-3,20-dione.

References Cited

UNITED STATES PATENTS

| | | | |
|---|---|---|---|
| 2,953,581 | 9/1960 | Jensen | 260—397.3 |
| 2,965,654 | 12/1960 | Bergstrom | 260—397.3 |
| 3,178,412 | 4/1965 | Ringold | 260—239.55 |
| 3,205,226 | 9/1965 | Barton | 260—239.55 |
| 3,546,215 | 12/1970 | Fried | 260—239.55 |

HENRY A. FRENCH, Primary Examiner

U.S. Cl. X.R.

424—243